UNITED STATES PATENT OFFICE.

ELI HAMLIN DUNN, OF ELMA, IOWA.

METHOD OF PREPARING FLOUR.

SPECIFICATION forming part of Letters Patent No. 449,794, dated April 7, 1891.

Application filed December 22, 1890. Serial No. 375,497. (No specimens.)

*To all whom it may concern:*

Be it known that I, ELI HAMLIN DUNN, a citizen of the United States, residing at Elma, in the county of Howard and State of Iowa, have invented certain new and useful Improvements in the Method of Increasing the Food Value of Bolted Flour; and I do declare the following to be a full, clear, and exact description of my invention, which will enable others skilled in the art to which it pertains to make and use the same.

The object of my invention is to isolate the food constituents of that portion of grain which has been separated from the flour in the process of bolting and without admitting any appreciable amount of the coloring-matter, inert particles, or other unwholesome substances originally present in this part of the grain restore these food constituents to the flour in the proportion in which they originally existed in the grain.

In view of this my invention consists in washing bran and shorts with cold water, to remove the starch, gluten, and soluble food constituents, in the employment of innocuous acid and alkaline solutions to promote the solution, precipitation, and separation of the otherwise insoluble salts and food substances remaining in the bran and shorts, and in washing, drying, and pulverizing the food substances thus obtained.

To carry my invention into effect I wash the bran and shorts with cold water in any suitable apparatus till the washings cease to run through milky, allow the liquid portion to stand in vats a few hours, and then decant the supernatant fluid from the deposit, express the mass of bran and shorts thus washed and add to it one-eighth of its original weight of acetic or hydrochloric acid, dilute with twenty times its own bulk of water, macerate twelve hours, then express the mass and pass cold water through it till the washings cease to have a sour taste. Then add to the acid solution thus separated from the bran and shorts ammonia-water, say twice the bulk of acid employed or till the solution ceases to have a sour taste and till it will turn red litmus paper blue. Then drain the mixture through firm muslin, and when the liquid has run off remove the magma to a vessel and thoroughly agitate and wash it with twice its bulk of cold water, and again allow the fluid to drain off through muslin. Now add the substance thus collected to the starch and gluten deposit obtained from the first washing, mix them, and dry on a water-bath at a temperature not exceeding 212° Fahrenheit. When thoroughly dry, pulverize and add to the bolted flour either before or during the process of bread-making.

In order to supply to bolted flour the food constituents thus extracted in the proportion in which they originally existed in the grain, I add to a given quantity of flour the extractive matter obtained from the boltings—i. e., the bran, shorts, &c.—derived from the grain required to make the flour, which would ordinarily be about one part, by weight, of extractive matter to twenty-five parts of flour. By first washing the bran and shorts in this manner the starch, gluten, and all the soluble substances are removed and are not acted upon by the acid, while the insoluble salts, remaining among which are phosphates of calcium and magnesium, are readily dissolved by the acid separated by the subsequent washings and precipitated out of solution by the alkali. I may employ any acid that will ordinarily dissolve phosphate of calcium, and which is of itself innocuous, or which does not combine with the salts existing in the bran and shorts or with the alkali employed to form deleterious substances that cannot be eliminated by the washings.

I have particularly described the use of hydrochloric and acetic acid, as they are usually the most available, as the latter could be obtained by process of fermentation. Nitric, sulphuric, tartaric, or citric acid would answer. I have likewise described the use of ammonia to precipitate the salts out of solution. Any other alkali not harmful in effect will answer.

An important advantage of my invention is that it supplies to bolted flour of wheat or other cereals in the proportion in which they existed in the grain the identical food constituents of the investing coats and germ, in which reside a large percentage of the nutritive salts of the berry. It furthermore eliminates the coloring-matter and indigestible, inert, ligneous particles of the cortical portion of the grain, such as always exist in unbolted flour to its detriment as a food. In thus securing the entire food value of the grain it increases the quality and digestibility of the flour and preserves the usual lightness, whiteness, and palatability of our bread so much desired by all.

Having fully described my invention, what I claim, and desire to secure by Letters Patent, is—

The process of separating the food constituents from bran and shorts or the cortical portion and germ of wheat or other cereals and utilizing the same, which consists in washing the boltings with cold water until the starch, gluten, and soluble salts are removed, then macerating with dilute innocuous acid to dissolve the phosphates remaining, separating the acid solution from the boltings, precipitating the salts out of solution by addition of ammonia or other innocuous alkali, then washing, collecting, drying, and pulverizing the product thus obtained and adding it in the proportions named to flour, substantially as described.

ELI HAMLIN DUNN.

Witnesses:
ERNEST EDWARD MILLER,
AUGUSTUS ALLEN CARTER.